United States Patent [19]

Okamoto et al.

[11] Patent Number: 4,905,104
[45] Date of Patent: Feb. 27, 1990

[54] ROTARY HEAD TYPE DIGITAL SIGNAL RECORDING AND/OR REPRODUCING APPARATUS FOR RECORDING AND/OR REPRODUCING WITH A VARIABLE SPEED

[75] Inventors: Hiroo Okamoto; Takaharu Noguchi; Masaharu Kobayashi; Taihei Nakama, all of Yokohama, Japan

[73] Assignee: Hitachi, Ltd., Tokyo, Japan

[21] Appl. No.: 76,604

[22] Filed: Jul. 22, 1987

[30] Foreign Application Priority Data

Jul. 22, 1986 [JP]  Japan .................................. 61-170774

[51] Int. Cl.⁴ .......................... G11B 21/04; G11B 5/52; G11B 5/09
[52] U.S. Cl. .......................................... 360/70; 360/8; 360/32; 360/73.05; 360/64
[58] Field of Search ...................... 360/8–10.3, 360/32, 27, 18, 70, 73, 19.1, 77, 39, 64, 73.04, 73.05, 73.08–73.14, 77.12–77.17, 11.1

[56] References Cited

U.S. PATENT DOCUMENTS

| 4,594,621 | 6/1986 | Noguchi et al. | 360/77 |
| 4,597,023 | 6/1986 | Rijckaert | 360/77 |

FOREIGN PATENT DOCUMENTS 0222235 5/1987 European Pat. Off. .

| 59-213005 | 12/1984 | Japan | 360/73 |
| 60-89861 | 5/1985 | Japan | 360/73 |
| 60-223075 | 11/1985 | Japan | 360/73 |
| 60-229264 | 11/1985 | Japan | 360/73 |
| 61-139906 | 6/1986 | Japan | 360/9.1 |
| 61-296556 | 12/1986 | Japan | 360/73 |

Primary Examiner—Aristotelis M. Psitos
Assistant Examiner—Steven R. Garland
Attorney, Agent, or Firm—Antonelli, Terry & Wands

[57] ABSTRACT

A rotary head type digital signal recording and/or reproducing apparatus wherein for ½ speed recording and/or reproducing from a magnetic tape, a tape feed speed is decreased to ½ times the normal speed, and a recording/reproducing interval becomes 2 times that of the normal mode of operation utilizing at least two rotary heads mounted at adjacent positions on a rotating cylinder with one of the rotary heads having a plus azimuth angle and the other having a minus azimuth angle. For 2 times speed recording/reproducing, a tape feed speed increases to 2 times the normal speed, and a recording/reproducing interval becomes ½ that of the normal mode of operation utilizing at least two rotary heads mounted on a rotating cylinder at opposite positions of a rotary axis of the cylinder, with one of the two rotary heads having a plus azimuth angle and the other having a minus azimuth angle.

24 Claims, 7 Drawing Sheets

ROTARY HEAD TYPE DIGITAL SIGNAL RECORDING AND/OR REPRODUCING APPARATUS FOR RECORDING AND/OR REPRODUCING WITH A VARIABLE SPEED

BACKGROUND OF THE INVENTION

The present invention relates to a rotary head type digital signal recording and/or reproducing apparatus, especially to a digital signal recording and/or reproducing apparatus which is suitable for recording and/or reproducing with a variable speed.

As an apparatus for recording and/or reproducing a digital signal with a rotary head, a PCM recorder is known as described, for example, in U.S. Pat. No. 4,594,621. According to the PCM recorder using the rotary head, it is possible to improve a recording density of recording signal, and to provide reproduction with high quality. One of functions of the PCM recorder described above is to provide a long time recording/reproducing and/or a high speed dubbing. Such function can be obtained by varying a number of the rotations of the rotary head and a tape feed speed simultaneously.

In the prior art, in case of varying the number of the rotation of the rotary head, it is also necessary to vary a frequency of a recording signal for maintaining a constant recording density. As a result of varying a frequency, a signal to noise ratio (S/N) is decreased at a low speed because an output of the rotary head decreases at a low frequency of the signal. Also, a S/N ratio is decreased at a high speed because a frequency characteristic of the rotary head deteriorates at a high frequency of the signal.

SUMMARY OF THE INVENTION

As object of the present invention is to provide a digital signal recording and/or reproducing apparatus which is capable of recording or reproducing with a speed of N times or 1/N times of a normal speed without varying a recording or reproducing frequency.

In accordance with the present invention, at the time of recording or reproducing at N times speed to a speed in a normal mode, a tape feed speed is increased N times to a normal mode, and a gap between tracks is changed 1/N times to the normal mode. For example, at the time of a half speed recording, a tape feed speed is a half of a normal mode and a recording is effected in a ratio of one to two times as compared to a normal mode of recording. According to the present invention, it is possible to record or reproduce at N times or 1/N times speed to a normal speed.

DETAILED DESCRIPTION OF THE PREFERRED EMBODIMENTS

Figure 1:
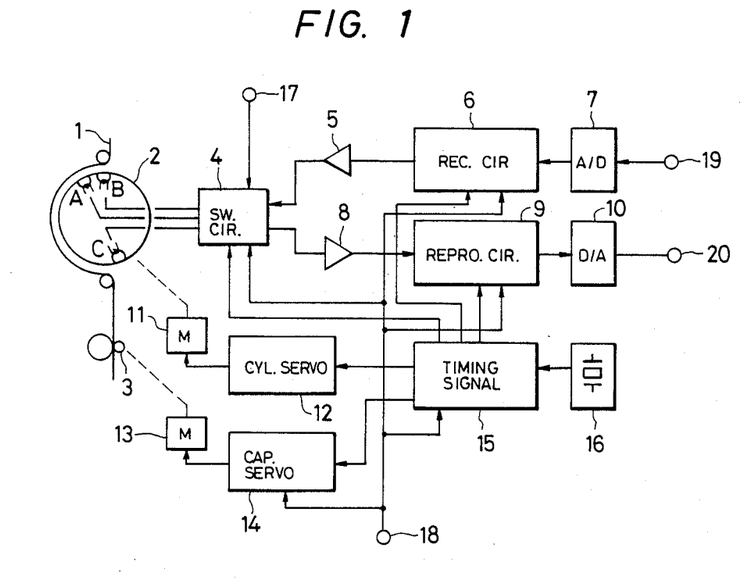
FIG. 1 illustrates a block diagram of a digital signal recording and reproducing apparatus for an embodiment of the present invention.

FIG. 1 shows a block diagram of an embodiment of a digital signal recording and reproducing apparatus of the present invention. In FIG. 1, the reference numeral 1 indicates a magnetic tape, the numeral 2 indicates a rotary head, the numeral 3 indicates a capstan, the numeral 4 indicates a head switching circuit, the numeral 5 indicates a recording amplifier, the numeral 6 indicates a recording circuit, the numeral 7 indicates an A/D converter, the numeral 8 indicates a reproducing amplifier, the numeral 9 indicates a reproducing circuit, the numeral 10 indicates a D/A converter, the numeral 11 indicates a cylinder motor of the rotary head 2, the numeral 12 indicates a servo circuit of the cylinder motor 11, the numeral 13 indicates a motor of the capstan 3, the numeral 14 indicates a servo circuit of the capstan motor 13, the numeral 15 indicates a timing signal generating circuit, and the numeral 16 indicates an oscillating circuit.

Three heads A, B and C are arranged on a cylinder as the rotary head 2. The heads A and B are arranged at positions adjacent each other. The head A has a plus azimuth angle, and the head B has a minus azimuth angle. Instead of the two heads A and B, a head having two gaps of different azimuth angles can also be used. The head C is arranged at a position opposite to the heads A and B along an axis of the cylinder, and has a minus azimuth angle. These three heads A, B and C are connected to the head switching circuit 4 through a rotary transformer arranged on the cylinder. The rotary transformer is not shown in the drawing. The magnetic tape 1 is wound around the rotary head 2. In FIG. 1, a wound angle of 180 degrees is utilized. However, a wound angle of 90 degree, for example, may also be utilized.

In a normal mode or recording/reproducing, the heads A and B are used. In case of recording, a recording signal input from an input terminal 19 is converted to a PCM signal by the A/D converter 7. When the input signal is a digital signal, the A/D converter 7 can be omitted. The PCM signal is input to the recording circuit 6 in which a signal has been processed so as to add a synchronizing signal and an error correction code. The processed PCM signal is amplified to a predetermined level by the recording amplifier 5, and input to the head switching circuit 4. The switching circuit 4 supplies the recording signal to the head A and the head B alternately is response to the timing signal produced in the timing signal generating circuit 15. The signal is recorded on the magnetic tape 1 by the head A or the head B.

In case of reproducing, reproducing signal reproduced for the head A or the head B are selected by the switching circuit 4, and are output to the reproducing amplifier 8. A reproducing signal amplified to a predetermined level by the reproducing amplifier 8 is processed by demodulation of the PCM signal and an error correction by the reproducing circuit 9, and converted to an analogue signal by the D/A converter 10, and output from an output terminal 20. In case of outputting the digital signal, the D/A converter can be omitted.

The cylinder servo circuit 12 and the capstan servo circuit 14 control the cylinder motor 1 and the capstan motor 13, respectively, in response to the predetermined timing signal produced by the timing signal generating circuit 15. The timing signal generating circuit 15 produces timing signals for controlling each circuit. The timing signal is produced based on a reference clock from the oscillating circuit 16.

The reference numeral 17 indicates an input terminal of a switching signal which switches over a recording mode and a reproducing mode. The reference numeral 18 indicates an input terminal of a switching signal which effects switching for half speed or a double speed recording/reproducing as described hereinafter.

Figure 2:
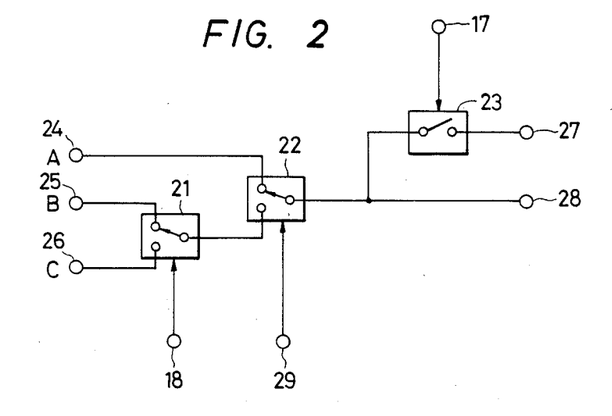
FIG. 2 illustrates a detailed view of a head switching circuit shown in the embodiment of FIG. 1.

FIG. 2 shows a detailed view of the head switching circuit 4 shown in FIG. 1. The head switching circuit 4 consists of three switches 21, 22 and 23. Terminals 24, 25 and 26 are connected to the head A, the head B and the head C, respectively. A terminal 27 is connected to the output of the recording amplifier 5, and a terminal 28 is connected to the input of the reproducing amplifier 8. The switch 21 selects the head B or the head C, both of which have the minus azimuth angle, in response to the switching signal of the half speed recording and the double speed recording. In the normal mode of operation, the head B is selected. The switch 22 changes the head A of the plus azimuth angle in response to the head switching control signal input through an input terminal 29. The switch 23 changes the recording and the reproducing based on the recording/reproducing switching signal input from the terminal 17. In the recording mode, the switch 23 is turned on, and the recording signal input from the input terminal 27 is output to the head. In the reproducing mode, the switch 23 is turned off and the reproducing signal output from the head is output through the terminal 28.

FIGS. 3A-3G show timing charts in case of a normal recording. A recording to one track is effected during one revolution of the cylinder. At every one revolution of the cylinder, the head A and the head B are changed alternately for recording.

Figure 3A:
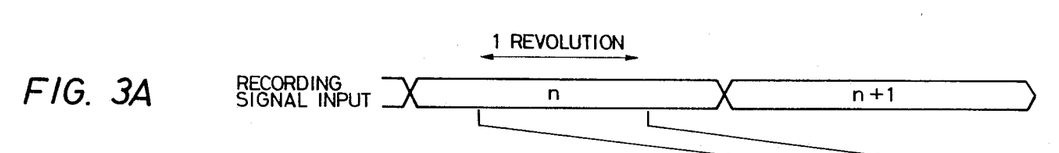
FIGS. 3A-3G illustrate time charts for a time of a normal recording.
Figure 3B:
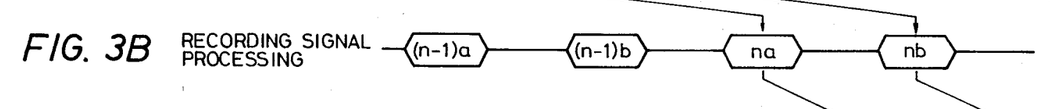
Figure 3C:
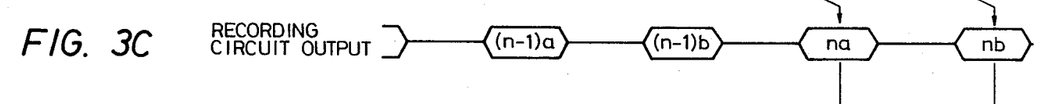
Figure 3D:
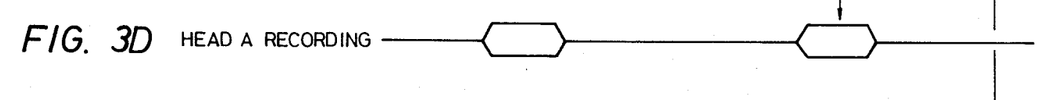
Figure 3E:
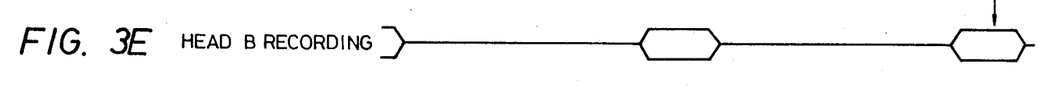
Figure 3F:
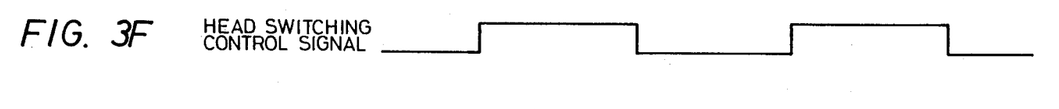

The recording signal inputs from the terminal 19 in the blocks of two tracks which corresponds to two revolutions of the cylinder are shown in FIG. 3A. For example, the recording signal which is input at n-th order is processed in the recording circuit 6 at the next cycle of two revolutions of the cylinder in the blocks of two tracks na, nb as shown in FIG. 3B, and recorded by the head A and the head B respectively as shown in FIGS. 3C, 3D and 3E. The timing signal generating circuit 15 produces the head switching control signal and the cylinder servo reference signal in synchronism with the recording timing described above as shown in FIGS. 3F and 3G. When the head switching control signal has a "high" level, the switch 22 selects the head A. When it has a "low" level, the switch 22 selects the head B.

The cylinder servo circuit 12 controls the cylinder so as to coincide a leading edge of the recording signal with a position where the head A or the head B of the rotary head begins to touch the magnetic tape 1 based on the cylinder servo reference signal. The recording has been effected during a period of 180 degree rotation of the rotary head when the head A or the head B touches the magnetic tape. During the remaining 180 degree rotation of the rotary head, the recording is not effected.

FIGS. 4A-4G show timing charts for a normal reproducing operation. in case of reproducing, a reproducing timing at the head A and the head B is the same as the recording timing in case of the recording. The signal processing in the reproducing circuit 9 and the timing of outputting the reproducing signal is reverse of that in case of the recording shown in FIGS. 3A-3G.

Figure 5:
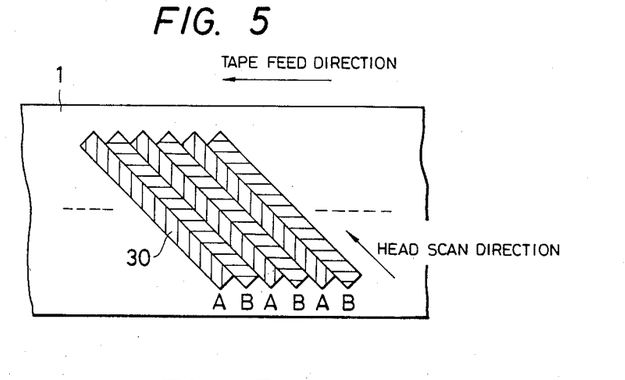
FIG. 5 illustrates a recording pattern on a tape for a time of a normal recording.

FIG. 5 shows a recording pattern on the magnetic tape for a normal recording operation. The reference numeral 30 indicates one track formed on the magnetic tape 1. The tracks having plus azimuth angle and the tracks having minus azimuth angle are recorded alternately by the head A and the head B.

Next, the operation of half speed recording/reproducing is explained. In case of the half speed recording/reproducing operation, the tape feed speed decreases to one half of the normal speed, and a recording interval becomes double that of the normal recording. Namely, one track is recorded in two cylinder revolutions. The tape speed is controlled by the capstan servo circuit 14. The head A and the head B are also used in a manner similar to the normal mode to operation.

Figure 6A:
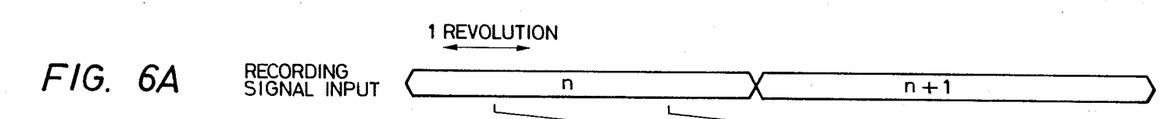
FIGS. 6A-6G illustrate time charts for a time of a half speed recording.
Figures 6B, 6C, 6D:
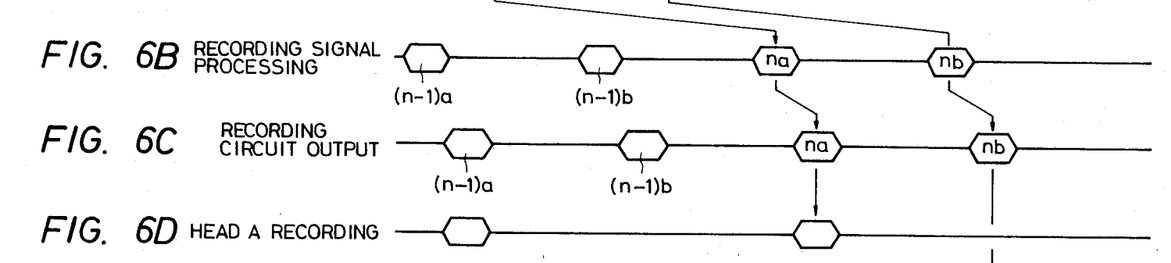
Figure 6E:
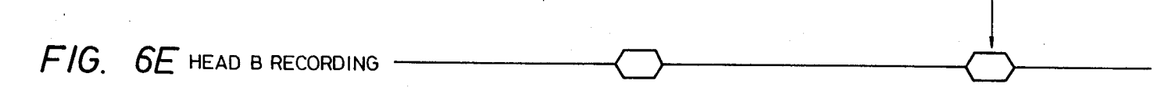
Figure 6F:
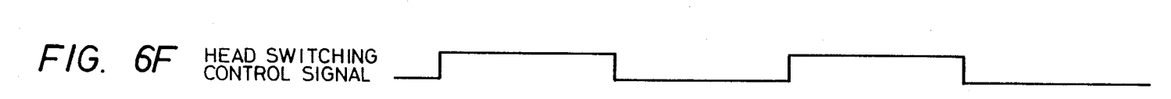

FIGS. 6A-6G show timing charts in case of the half speed recording. The input of the recording signal is effected in the blocks of two tracks which corresponds to four revolutions of the cylinder as shown in FIG. 6A. The recording signal is processed in the recording circuit at the next cycle of the four revolutions of the cylinder, and recorded by the head A and the head B, respectively, as shown in FIGS. 6C, 6D and 6E.

Figure 3G:
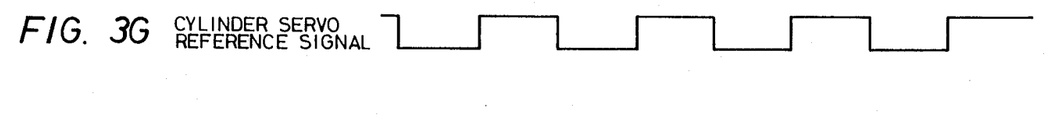
Figure 4A:
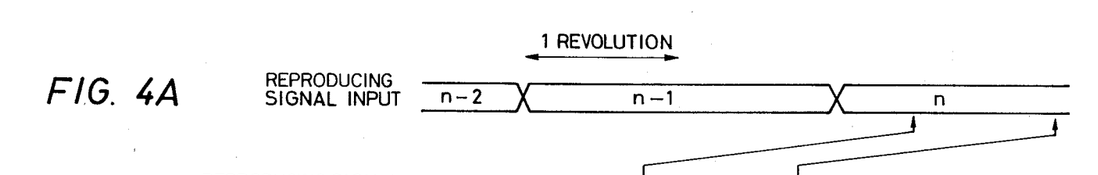
FIGS. 4A-4G illustrate time charts for a time of a normal reproducing.
Figure 4B:
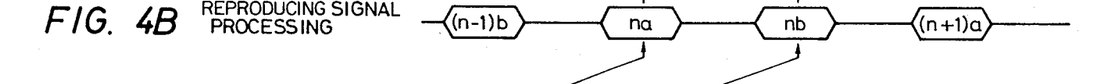
Figure 4C:
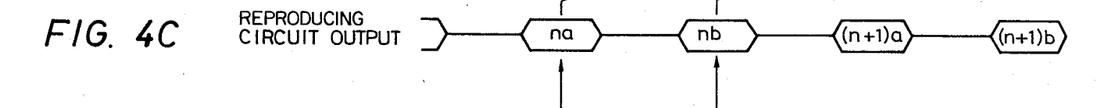
Figure 4D:
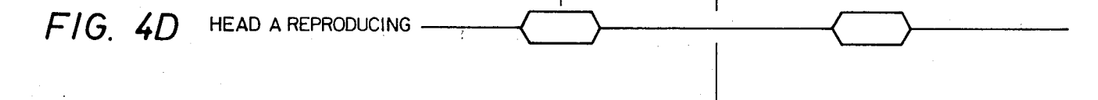
Figure 4E:
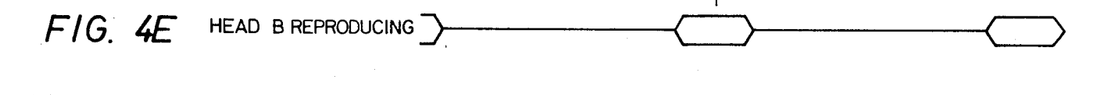
Figure 4F:
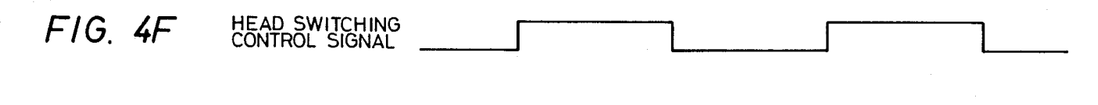
Figure 4G:
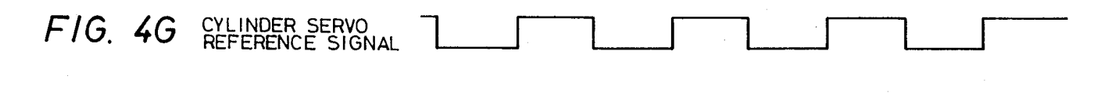
Figure 6G:
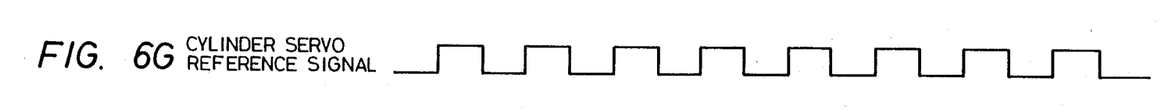

The signal processing and recording operation in the unit of track is the same as described in FIGS. 3A-3G. The only difference in FIGS. 6A-6G compared with FIGS. 3A-3G is a longer duration. A cycle of the head switching control signal in FIG. 6G is twice that of FIG. 3F. A cycle of the cylinder servo reference signal as shown in FIG. 6G is the same as that for normal recording as shown in FIG. 3G.

In case of reproducing, a reproducing timing at the head A and the head B is the same as that for the recording timing in case of the recording. The signal processing in the reproducing circuit 9 and the timing of outputting the reproducing signal is reverse of that in case of the recording.

Figure 7:
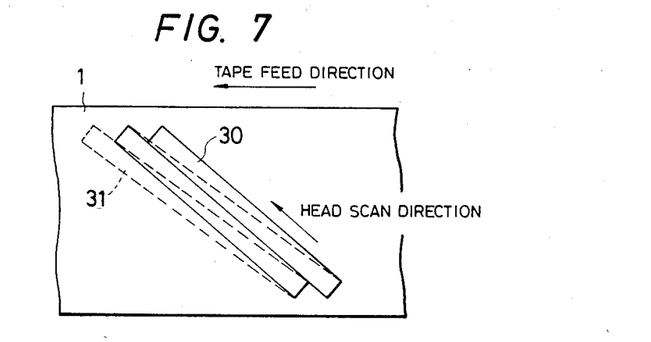
FIG. 7 illustrates a recording pattern for a time of a half speed recording.

FIG. 7 shows a recording pattern on the magnetic tape in case of the normal recording and the half speed recording. The reference numeral 30 indicates one track in case of the normal recording. The reference numeral 31 indicates one track in case of the half speed recording. Since only the tape feed speed is changed with a constant numbers of the revolution of the cylinder, a track width and a track length are the almost same, respectively. Therefore, a recording density and a recording/reproducing frequency is the same compared with the normal recording/reproducing operation.

Although the above explanation is directed to the case of the half speed recording, a 1/N times speed recording can also be done by recording a signal in a ratio of one track to N revolutions of the cylinder. And the tape feed speed decreases 1/N times with respect to the normal speed operation.

Next, the operation of double speed recording/reproducing is explained. In case of the double speed recording/reproducing operation, the tape feed speed increases twice that of the normal speed, and a recording interval becomes one half of that for the normal recording. Namely, the recording on two tracks is effected during one revolution of the cylinder by using the head A and the head C. The switch 21 in FIG. 2 selects the head C.

Figure 8A:
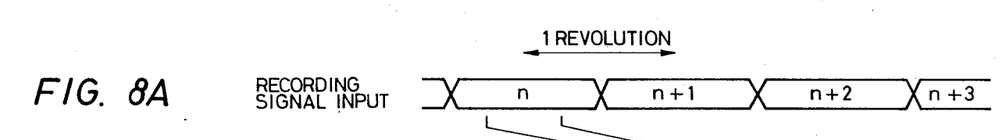
FIGS. 8A-8G illustrate time charts for a time of a double speed recording.
Figure 8B:
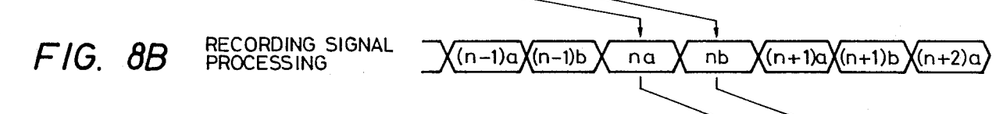
Figure 8C:
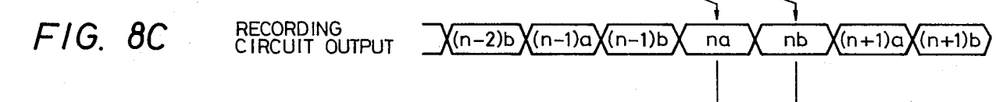
Figure 8D:
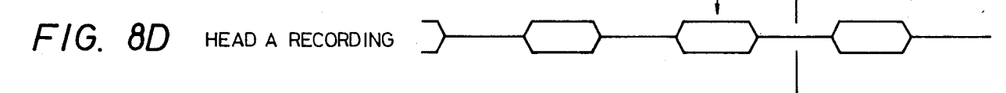
Figure 8E:
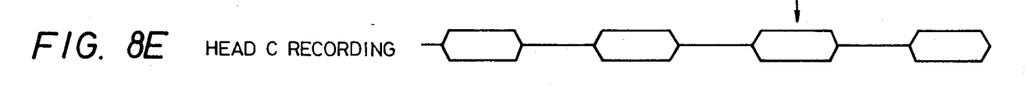

FIG. 8A-8G show timing charts in case of the double speed recording. The input of the recording signal is effected in the blocks of two tracks which corresponds to one revolution of the cylinder as shown in FIG. 8A. The recording signal is processed in the recording circuit at the next cycle of the one revolution of the cylinder as shown in FIG. 8B, and recording by the head A and the head C, respectively, as shown in FIG. 8C, 8D and 8E.

Figure 8F:
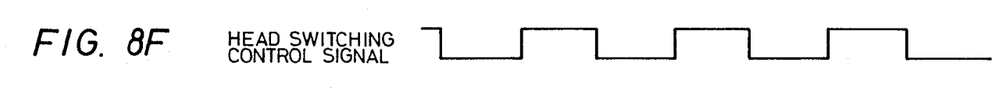
Figure 8G:
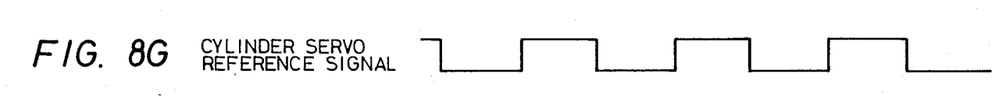

The signal processing and recording operation int he unit of track is the same as described in FIGS. 3A-3G. The only difference in FIGS. 6A-6G compared with FIGS. 3A-3G is a shortened duration. A cycle of the head switching control signal in FIG. 8F is one half of that of FIG. 3F. A cycle of the cylinder servo reference signal shown in FIG. 8G is the same as normal recording shown in FIG. 3G.

In case of reproducing, a reproducing timing at the head A and the head C is the same as the recording timing in case of the recording. The signal processing in the reproducing circuit 9 and the timing of outputting the reproducing signal is reverse of that in case of the recording.

Figure 9:
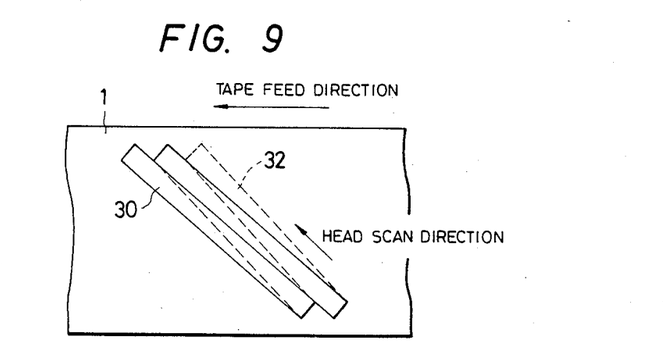
FIG. 9 illustrates a recording pattern for a time of a double speed recording.

FIG. 9 shows a recording pattern on the magnetic tape in case of the normal recording and the double speed recording. The reference numeral 30 indicates one track in case of the normal recording. The reference numeral 32 indicates one track in case of the double speed recording. Since only the tape feed speed is changed with a constant numbers of the revolution of the cylinder, a track width and a track length are almost the same, respectively. Therefore, a recording density and a recording/reproducing frequency is the same compared with that of the normal recording/reproducing operation.

Although the above explanation is directed to the case of the double speed recording, an N times speed recording can also be effected by recording a signal in a ratio of N tracks to one revolution of the cylinder. And the tape feed speed increase N times to the normal speed operation.

In the embodiment of the present invention described above, the half speed recording/reproducing and the double speed recording/ reproducing are explained. However, as described above the head C is not necessary for the half speed recording/reproducing.

Figure 10A:
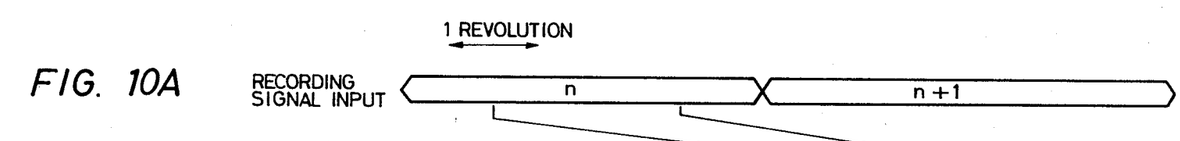
FIGS. 10A-10G illustrate time charts for a time of a half speed recording in another embodiment of the present invention.
Figure 10B:
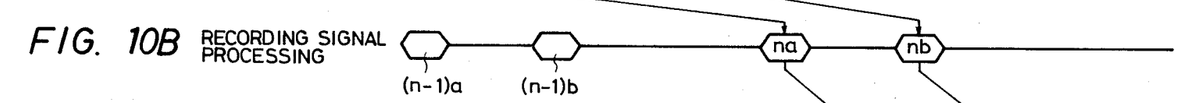
Figure 10C:
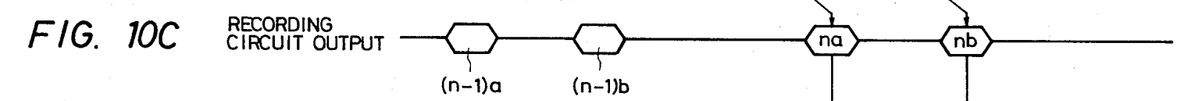
Figure 10D:
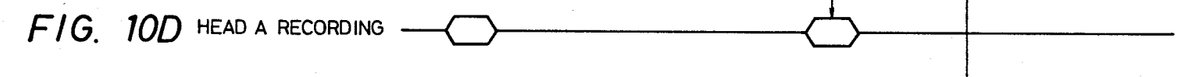
Figure 10E:
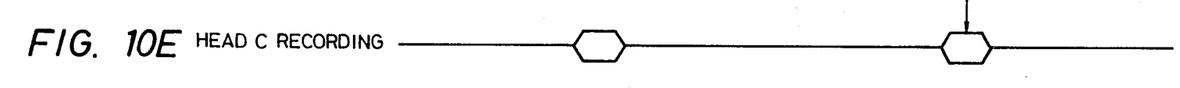
Figure 10F:
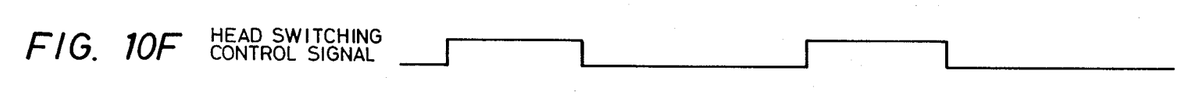
Figure 10G:
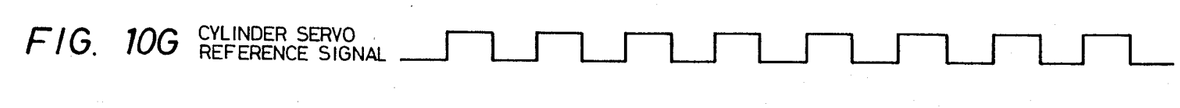

On the other hand, the half speed recording/reproducing can also utilize the head A and the head C has shown in FIGS. 10A-10C. The tape feed speed decreases one half of the normal speed, and a recording interval becomes twice that of the normal recording. Namely, one track is recorded in two cylinder revolutions. FIGS. 10A-10G show timing charts in case of the half speed recording. The input of the recording signal is effected in the blocks of two tracks which corresponds to four revolutions of the cylinder. The recording signal is processed in the recording circuit at the next cycle of the four revolutions of the cylinder, and recorded by the head A and the head C, respectively. The signal processing and recording operation in the unit of two tracks is effected as shown in FIGS. 10B, 10C, 10D and 10E. when the head switching control signal shown in FIG. 10F has a "high" level, the switch selects the head A. When it has a "low" level, the switch selects the head C. The "high" level period and the "low" level period of the head switching control signal is different for using the head C, respecitvely. Therefore, the track width recorded by the head A is narrower than the track width recorded by the head C. According to the narrow track width, the sensitivity of the signal recorded on the track A by the head A decreases compared with the embodiment described in FIGS. 3A-3G. However, this sensitivity is improved compared with the prior art. A cycle of the cylinder servo reference signal is the same as that for normal recording as shown in FIG. 3G.

If, at the timing shown in FIGS. 6A-6G, the revolution number of the cylinder and the tape feed speed are set for a normal recording/ reproducing, the double speed recording/reproducing is available by the timing shown in FIGS. 3A-3G, and a four times speed recording/reproducing is available by the timing shown in FIGS. 8A-8G. If, at the timing shown in FIGS. 8A-8G, the revolution number of the cylinder and the tape feed speed are set for a normal recording/reproducing, the half speed recording/reproducing is available by the timing shown in FIGS. 3A-3G, and a quarter times speed recording/reproducing is available by the timing shown in FIGS. 6A-6G.

As described above, the present invention provides, a digital signal recording and reproducing apparatus which is capable of recording or reproducing with a speed of N times or 1/N times of a normal speed without varying a recording or reproducing frequency.

We claim:

1. An apparatus utilizing at least one rotary head for at least one of recording and reproducing a digital signal on and from tracks of a recording medium, comprising:
   means for controlling a feed speed of the recording medium; and
   means for controlling a timing of at least one of a recording and reproducing interval between tracks of the recording medium;
   wherein for at least one of recording and reproducing the digital signal on the recording medium at one of a normal recording speed and normal reproducing speed, the feed speed control means controls the feed speed of the recording medium to a normal feed speed and the timing control means controls at least one of the recording interval and reproducing interval to at least one of a normal recording and reproducing interval between tracks, and for at least one of recording and reproducing at $\frac{1}{2}$N times the normal speed for at least one of recording and reproducing, the feed speed control means controls the recording medium feed speed to $\frac{1}{2}$N times the normal speed, and the timing control means controlling one of the recording and reproducing interval between tracks to 2N times the at least one of the normal recording and reproducing interval when the speed for at least one of recording and reproducing is at $\frac{1}{2}$N times, N being an integer greater than one; and
   wherein at least two rotary heads are mounted at adjacent positions on a rotating cylinder, one of the at least two rotary heads having a plus azimuth angle and the other of the at least two rotary heads having a minus azimuth angle.

2. The apparatus according to claim 1, wherein for recording at $\frac{1}{2}$N times speed recording, the feed speed control means controls the recording medium feed speed so as to record one track in 2N revolutions of the cylinder having the at least one rotary head mounted thereon.

3. The apparatus according to claim 1, wherein the recording medium is a magnetic tape.

4. The apparatus according to claim 1, wherein for reproducing at $\frac{1}{2}$N times the normal speed, the feed speed control means controls the recording medium feed speed so as to reproduce one track in 2N revolutions of the cylinder.

5. The apparatus according to claim 1, wherein for at least one of recording at $\frac{1}{2}$N times the normal speed and for reproducing at $\frac{1}{2}$N times the normal speed, the feed speed control means controls the recording medium feed speed so as to at least one of record one track and reproduce one track in 2N revolutions of the cylinder having the at least one rotary head mounted thereon.

6. An apparatus according to claim 1, further comprising means for rotating the cylinder at a constant speed independently of the feed speed of the recording medium.

7. An apparatus utilizing at least one rotary head for at least one of recording and reproducing a digital signal on and from tracks of a recording medium, comprising:

means for controlling a feed speed of the recording medium; and means for controlling a timing of at least one of a recording and reproducing interval between tracks of the recording medium;

wherein for at least one of recording and reproducing the digital signal on the recording medium at one of a normal recording speed and normal reproducing speed, the feed speed control means controls the feed speed of the recording medium to a normal feed speed and the timing control means controls at least one of the recording interval and reproducing interval to at least one of a normal recording and reproducing interval between tracks, and for at least one of recording and reproducing at $\frac{1}{2}$ times the normal speed for at least one of recording and reproducing, the feed speed control means controls the recording medium speed to $\frac{1}{2}$ times the normal speed, and the timing control means controls one of the recording and reproducing interval between tracks to 2 times the at least one of the normal recording and reproducing interval when the feed speed for at least one of recording and reproducing is at $\frac{1}{2}$ times the normal speed; and wherein at least two rotary heads are mounted at adjacent positions on a rotating cylinder, one of the at least two rotary heads having a plus azimuth angle and the other of the at least two rotary heads having a minus azimuth angle.

8. The apparatus according to claim 7, wherein for recording at $\frac{1}{2}$ times the normal speed, the feed speed control means controls the recording medium feed speed so as to record one track in two revolutions of the cylinder.

9. The apparatus according to claim 7, wherein the recording medium is a magnetic tape.

10. The apparatus according to claim 7, wherein for reproducing at $\frac{1}{2}$ times the normal speed, the feed speed control means controls the recording medium feed speed so as to reproduce one track in two revolutions of the cylinder.

11. The apparatus according to claim 7, wherein for at least one of recording at $\frac{1}{2}$ times the normal speed and for reproducing at $\frac{1}{2}$ times the normal speed, the feed speed control means controls the recording medium feed speed so as to at least one of record one track and reproduce one track in two revolutions of the cylinder.

12. An apparatus according to claim 7, further comprising means for rotating the cylinder at a constant speed independently of the feed speed of the recording medium.

13. An apparatus utilizing at least one rotary head for at least one of recording and reproducing a digital signal on and from tracks of a recording medium, comprising:

means for controlling a feed speed of the recording medium; and means for controlling a timing of at least one of a recording and reproducing interval between tracks of the recording medium;

wherein for at least one of recording and reproducing the digital signal on the recording medium at one of a normal recording speed and normal reproducing speed, the feed speed control means controls the feed speed of the recording medium to a normal feed speed and the timing control means controls at least one of the recording interval and reproducing interval to at least one of a normal recording and reproducing interval between tracks, and for at least one of recording and reproducing at 2N times the normal speed for at least one of recording and reproducing, the feed speed control means controls the recording medium feed speed to 2N times the normal speed, and the timing control means controls one of the recording and reproducing interval between tracks to $\frac{1}{2}$N times the at least one of the normal recording and reproducing interval when the feed speed for at least one of recording and reproducing is at 2N times, N being an integer greater than one; and wherein at least two rotary heads are mounted on a rotating cylinder at opposite positions of a rotary axis of the cylinder, one of the at least two rotary heads having a plus azimuth angle and the other of the at least two rotary heads having a minus azimuth angle.

14. The apparatus according to claim 13, wherein for recording at 2N times the normal speed, the feed speed controls the recording medium feed speed so as to record on two N tracks by one revolution of the cylinder.

15. The apparatus according to claim 13, wherein the recording medium is a magnetic tape.

16. The apparatus according to claim 13, wherein for reproducing at 2N times the normal speed, the feed speed control means controls the recording medium feed so as to reproduce from two N tracks by one revolution of the cylinder.

17. The apparatus according to claim 13, wherein for at least one of recording at 2N times the normal speed and reproducing at 2N times the normal speed, the feed speed control means controls the recording medium feed speed so as to at least one of record on two N tracks and reproduce from two N tracks by one revolution of the cylinder.

18. An apparatus according to claim 13, further comprising means for rotating the cylinder at a constant speed independently of the feed speed of the recording medium.

19. An apparatus utilizing at least one rotary head for at least one of recording and reproducing a digital signal on and from tracks of a recording medium, comprising:
  means for controlling a feed speed of the recording medium; and
  means for controlling a timing of at least one of a recording and reproducing interval between tracks of the recording medium;
  wherein for at least one of recording and reproducing the digital signal on the recording medium at one of a normal recording speed and normal reproducing speed, the feed speed control means controls the feed speed of the recording medium to a normal feed speed, and the timing control means controls at least one of the recording interval and reproducing interval to at least one of a normal recording and reproducing interval between tracks, and for at least one of recording and reproducing at 2 times the normal speed for at least one of recording and reproducing, the feed speed control means controls the recording medium feed speed to 2 times the normal speed, and the timing control means controls one of the recording and reproducing interval between tracks to $\frac{1}{2}$ times the at least one of the normal recording and reproducing interval when the feed speed for at least one of recording and reproducing is at 2 times the normal speed; and
  wherein at least two rotary heads are mounted on a rotating cylinder at opposite positions of a rotary axis of the cylinder, one of the at least two rotary heads having a plus azimuth angle and the other of the at least two rotary heads having a minus azimuth angle.

20. The apparatus according to claim 19, wherein for recording at two times the normal speed, the feed speed control means controls the recording medium feed speed so as to record on two tracks by one revolution of the cylinder.

21. The apparatus according to claim 19, wherein the recording medium is a magnetic tape.

22. The apparatus according to claim 19, wherein for reproducing at 2 times the normal speed, the feed speed control means controls the recording medium feed speed so as to reproduce from two tracks by one revolution of the cylinder.

23. The apparatus according to claim 19, wherein for at least one of recording at two times the normal speed and reproducing at 2 times the normal speed, the feed speed control means control the recording medium feed speed so as to at least one of record on two tracks and reproduce from two tracks by one revolution of the cylinder.

24. An apparatus according to claim 19, further comprising means for rotating the cylinder at a constant speed independently of the feed speed of the recording medium.

* * * * *